United States Patent
Williams

(10) Patent No.: US 7,524,989 B2
(45) Date of Patent: Apr. 28, 2009

(54) STABILIZED HYDROXYLAMINE SOLUTIONS

(75) Inventor: Richard J. Williams, Wharton, NJ (US)

(73) Assignee: BASF Aktiengesellschaft, Ludwigshafen (DE)

(*) Notice: Subject to any disclaimer, the term of this patent is extended or adjusted under 35 U.S.C. 154(b) by 240 days.

(21) Appl. No.: 10/491,422

(22) PCT Filed: Sep. 26, 2002

(86) PCT No.: PCT/EP02/10797

§ 371 (c)(1), (2), (4) Date: Apr. 1, 2004

(87) PCT Pub. No.: WO03/031330

PCT Pub. Date: Apr. 17, 2003

(65) Prior Publication Data

US 2004/0242931 A1  Dec. 2, 2004

(51) Int. Cl.
*C07C 239/08* (2006.01)

(52) U.S. Cl. .............. 564/301; 564/2; 564/300

(58) Field of Classification Search ............. 564/2
See application file for complete search history.

(56) References Cited

U.S. PATENT DOCUMENTS

| 4,482,626 A | * | 11/1984 | Twist et al. ............ 430/380 |
| 4,778,669 A | | 10/1988 | Fuchs et al. |
| 5,288,907 A | * | 2/1994 | Sherwin et al. ......... 564/301 |
| 5,808,150 A | | 9/1998 | Michelotti |
| 6,534,681 B1 | * | 3/2003 | Watzenberger et al. ...... 564/2 |

FOREIGN PATENT DOCUMENTS

| EP | 1 245 535 | | 10/2002 |
| WO | WO 01/10777 A1 | * | 2/2001 |

OTHER PUBLICATIONS

RD 188,043, pp. 1-5, Dec. 10, 1979, Vincent et al.*
Patent Abst. of Japan 58 069841.

* cited by examiner

*Primary Examiner*—Brian J Davis
(74) *Attorney, Agent, or Firm*—Novak Druce + Quigg LLP

(57) ABSTRACT

A stabilized hydroxylamine solution is disclosed. The stabilized solution comprises a selected stabilizer, which can be added during manufacture and/or storage of the hydroxylamine solution.

5 Claims, No Drawings

STABILIZED HYDROXYLAMINE SOLUTIONS

This application is a 371 of PCT/EP02/10797 filed Sep. 26, 2002.

BACKGROUND OF THE INVENTION

1. Field of the Invention

This invention relates to a stabilized hydroxylamine solution, and more particularly, to a hydroxylamine solution, which comprises a selected stabilizer.

2. Description of the Related Art

Hydroxylamine, especially in the form of its salts with sulfuric acid, hydrochloric acid and others, is an important intermediate for the chemical industry, and is widely employed in chemical syntheses. It is frequently necessary to employ hydroxylamine in the form of a solution of the free base, which is generally liberated from a hydroxylammonium salt such as, for example, hydroxylammonium sulfate or hydroxylammonium chloride, by the action of an appropriate base, such as ammonia, sodium hydroxide solution or an alcoholate. Neutral and alkaline hdyroxylamine solutions are unstable and decompose to form ammonia, nitrogen, oxides of nitrogen and water, so that their transportation or storage is highly problematic. The rate of decomposition increases with rising temperature, rising hydroxylamine concentration, rising pH and rising concentration of catalytically active impurities.

In Order to avoid the decomposition of the hydroxylamine, a stabilizer is added to the solutions. Numerous stabilizers for hydroxylamine are already known. Proposals which have been made are: thioglycolic acid (JP-A-58069843), glycerol monethers and ethylene oxide adducts thereof (DE-A-29 19 554), hydroxyanthraquinones (DE-A-33 43 600), hydroxyquinolines (DE-A-33 45 734), polyhydroxyhexano-1,4-lactone (DE-A-33 45 733), anthocyanins (DE-A-33 47 260), hydroxyquinaldines, flavones, benzonitrile, N-phenyl-N hydroxythiourea (DE-A-36 01 803), flavans (DE-A-33 43 599), thiosulfates, mercaptobenzothiazoles, mercaptoalkanols, mercaptothiazolines, thiuram disulfides, thioureas (EP-A-516 933), the tetrasodium salt of ethylenediaminetetraacetic acid, the trisodium salt of N-hydroxyethylenediaminetriacetic acid, polyvinylpyrrolidone or poly-N-vinyl-5-ethyl-2-oxazolidinone (U.S. Pat. No. 3,145,082), amide oximes (U.S. Pat. No. 3,480,391), hydroxamic acids (U.S. Pat. No. 3,480,391), hydroxyureas (U.S. Pat. No. 3,544,270), dipyridyl compounds (JP-A-58069842), aminoquinolines (JP-A-58069844), phenanthrolines (JP A-58069841), and polyhydroxyphenols (JP-A-4878099).

However, none of the stabilizers proposed to date has been able to provide hydroxylamine solutions with sufficient stabilization to prevent excessive decomposition of the hydroxylamine to occur, especially during storage.

What is desired and needed is a better means for stabilizing a hydroxylamine solution.

DETAILED DESCRIPTION OF THE INVENTION

This Invention relates to a stable hydroxylamine solution, and more particularly, to such a solution, which comprises a selected stabilizer.

Hydroxylamine is prepared commercially by the Raschig process or variations thereof, in which ammonium or sodium nitrite is reacted in aqueous solution with ammonium or sodium bi-sulfite and sulfur dioxide. The resulting disulfonate salts are subsequently hydrolyzed to a solution containing essentially hydroxylammonium sulfate, sulfuric acid, ammonium sulfate and/or sodium sulfate plus minor amounts of the corresponding nitrate. This solution can be used, after neutralization with a base, as a source of hydroxylamine or pure hydroxylammonium salts from the mixture.

A suitable selected stabilizer is selected. A suitable selected stabilizer is a compound which complexes or chelates metals, such as for example, Ca, Fe, Zn, Al, Cu, Ni, etc., which catalyze the decomposition of an aqueous hydroxylamine solution during its manufacture, storage and transportation. Such a stabilizer includes (a) diethylenetriaminepentaacetic acid ("DPTA"), (b) triethylenetetraminehexaacetic acid ("TTHA"), (c) ethylene-bis(oxyethylenentirilo)tetraacetic acid ("EGTA"), (d) 1,4,8,11-tetraazacyclotetradecane-1,4,8-11-tetraacetic acid, (e) 4,8-dihydroxyquinoline-2-carboxylic acid, (f) 4,5-dihydroxy-1,3-benzene-disulfonic acid, (g) 4,7-dihydroxy-1,10-phenanthroline, (h) 2-mercaptonicotinic acid, (i) bis[N,N'-bis(carboxymethyl)aminomethyl]fluorescein [fluorexon], (j) N,N-bis(2-carboxyethyl)-N,N'ethylenediglycine trihydrate, (k) Cystine, (1) 2,3-dihydroxybenzoic acid, (m) Thiosalicyclic acid, (n) a mixture of the any of the foregoing compounds and (n) and the salts of any of the foregoing compounds. Particularly preferred salts of the selected stabilizers include amine salts, e.g. triethylamine, triethanolamine; hydroxyamines; acid addition salts with inorganic acids, e.g. HF, HCl, HBr, $H_2SO_4$, $H_3PO_4$, etc., if basic functions are present.

The selected stabilizer is added or combined either with the reactants during the process for manufacturing the hydroxylamine solution, or during the storage of a basic or neutralized aqueous solution of such manufactured hydroxylamine.

The selected stabilizer is added to the reactants, e.g. Raschig process reactants, or to a neutral or basic aqueous hydroxylamine solution, e.g. in excess of 50-weight percent hydroxylamine solution, in an amount sufficient to stabilize the hydroxylamine solution. By "stabilize" is meant that the hydroxylamine concentration in the neutral or basic solution does not decompose or decrease by 2.0 weight percentage in a time period of 24 hours at a temperature of 25° C. Typically, the final concentration of the added selected stabilizer is present in the resultant neutral or basic hydroxylamine solution in an amount ranging from about 0.005 percent to about 0.1 percent by weight to the total weight of the resultant solution. In this regard, the concentration of hydroxylamine is in general 1-100% by weight, in particular 1-70% by weight, based an the overall weight of the resultant solution.

It is to be pointed out that the selected-stabilizer can be used as a single selected stabilizer or as a mixture of at least two selected stabilizers. Additionally, the selected stabilizer or stabilizers (mixture) can be combined with other well known stabilizer, such as, thioglycolic acid, glycerol monethers and ethylene oxide adducts thereof, hydroxylanthroquinones, hydroxyquinolines, polyhydroxyhexano-1,4-lactone, anthocyanins, hydroxyquinaldines, flavones, benzonitrile, N-phenyl-N-hydroxythiourea, flavans, thiosulfates, mercaptobenzothiazoles, mercaptothiazolines, thiuram disulfides, thioureas, the tetrasodium salt of ethylenediaminetetraacetic acid, the trisodium salt of N-hydroxyethylethylenediaminetriacetic acid, polyvinylpyrrolidone or poly-N-vinyl-5-ethyl-2-oxazolidinone, amide oximes, hydroxamic-acids, hydroxyureas, dipyridyl compounds, aminoquinolines, phenanthrolines, and polyhydroxyphenols. In this regard, reference is also made to U.S. Pat. No. 5,783, 161, which reveals other stabilizers.

Stabilizer for H-Base Weight loss Screening Test

Hydroxylamine (HA) and Ammonia Determination after Weight Loss Screening Test

| 1997 stabilized 56% HA + Fe(III) + Candidate | Wt loss g | % wt loss | % HA remaining after screening test | % ammonia formed during screening test | comment |
|---|---|---|---|---|---|
| Diethylenetriaminepentaacetic acid | 0 | 0 | 56 | 0 | |
| Triethylenetetraminehexaacetic acid (TTHA) | 0 | 0 | 55 | 0 | |
| Ethylenebis(oxyethylenenitrilo)tetra-acetic acid (EGTA) | 0 | 0 | 52 | 0 | |
| 1,4,8,11-tetraazacyclotetradecane-1,4,8,11-tetraacetic acid | 0 | 0 | 54 | 0 | |
| 4,8-dihydroxyquinoline-2-carboxylic acid | 0 | 0 | 54 | 0 | |
| 4,5-dihydroxy-1,3-benzenedisulfonic acid | 0 | 0 | 54 | 0 | Rose color |
| Thiosalicylic acid | 0 | 0 | 54 | 0 | Light yellow |
| Salicylic acid | 0.26 | 21 | 18 | 3.4 | Light yellow |
| 2-mercaptonicotinic | 0 | 0 | 54 | 0 | |
| 2-carboxyethylphosphonic acid | 0.2 | 16 | 19 | 4.7 | |
| cystine | 0 | 0 | 52 | 1.1 | |
| 4,7-dihydroxy-1,10-phenanthroline | 0.01 | 0.8 | 51 | 1.1 | Redish color |
| 1,4,8,11-tetraazacyclotetradecane-5,7-dione | 0.06 | 4.9 | 42 | 3.2 | |
| Fluorexon or {bis[N,N-bis(carboxy-methyl)-aminomethyl]fluorescein} | 0.01 | 0.8 | 54 | 0 | color |
| 1997 stabilized 55% HA "no candidate" | 0.34 | 28 | 16 | 2.2 | |
| CDTA | 0 | 0 | 55 | 0 | |
| N,N'-bis(2-carboxyethyl)-N,N'-ethylenediglycine trihydrate | 0 | 0 | 55 | 0 | |
| Inositolhexaphosphoric acid | 0.12 | 10 | 28 | 5 | |
| 2,3-dihydroxybenzoic acid | 0.02 | 1.6 | 50 | 1.6 | Some loss of sample before titration |

Gas Evolution Method

General Procedure: 4 mL glass vial on Top Loading Balance, 2 mL of Fe(III) [356 mg Fe(III) Sulfate-Hydrate/10 mL $H_2O$ ≅5000 ppm Fe(III)] add to 10 mL plastic beaker with micro stirrer, 100 mL of water or new stabilizer usually at 10000 ppm, 1 mL of either stabilized oder destabilized HA (1997 56%) contents transferred to glass vial+wt loss monitored vs. Time

| min. | 1997 | destabilized | min. | 1997 destabilized 2,6-Pyridinedicarboxylic acid | | min. | 1997 stabilized $H_2O$ | |
|---|---|---|---|---|---|---|---|---|
| 0 | 6.07 | wt loss | 0 | 6.02 | | 0 | 6.01 | |
| 1 | 6.06 | | 5 | 6.01 | .01 | 3 | 6.03 | 0.01 |
| 2 | 6.06 | .01 | 10 | 5.99 | .03 | 5 | 5.98 | 0.06 |
| 5 | 5.98 | .09 | 12 | 5.99 | .03 | 6 | 5.90 | 0.14 |
| 7 | 5.93 | .14 | 14 | 5.97 | .05 | 10 | 5.77 | 0.27 |
| 11 | 5.91 | .16 | 17 | 5.57 | .05 | 11 | 5.77 | 0.27 |
| 18 | 5.90 | .17 | 18 | 5.96 | .06 | 12 | 5.76 | 0.28 |
| 21 | 5.89 | .18 | 23 | 5.95 | .07 | 13 | 5.77 | 0.27 |
| 24 | 5.89 | .18 | 29 | 5.94 | .08 | 14 | 5.76 | 0.28 |
| 30 | 5.88 | .19 | 33 | 5.93 | .09 | 20 | 5.76 | 0.28 |
| 36 | 5.88 | .19 | 43 | 5.91 | 0.11 | 26 | 5.75 | 0.29 |
| 40 | 5.88 | .19 | 54 | 5.91 | 0.11 | 30 | 5.25 | 0.29 |
| 51 | 5.87 | 0.20 | | | | 42 | 5.74 | 0.30 |
| 61 | 5.86 | 0.21 | | | | | | |

Destabilization procedure - Pass 200 mL of 1997 56% HA through large anion column, collect effluent/Fraction every 50 mL.

Gas Evolution

| | | U4A15 | | U4A13 | | U4A9 | | 1997 SW | | U4AW | |
|---|---|---|---|---|---|---|---|---|---|---|---|
| 2 mL | 5000 ppm Fe(III) | 1.63 mg | | 1.98 mg | | 2.21 mg | | 2.02 | | 1.5 | |
| 100 mL | H₂O or Stabilizer | 99.18 mg 10,000 ppm | | 99.9 | | 100.2 mg | | 99.9 water | | 99.2 | |
| 1 mL | HA | 1189.9 mg | | 1170 mg | | 1173 mg | | 1199 | | 1182 | |
| Vial | | 4.90 g | | 4.85 | | 4.85 | | 4.88 6.02 | | 4.81 | |
| | | 1 | 6.04 | 1 | 5.86 | 1 | 5.95 | 0 | 1 | 6.02 | |
| | | 2 | 6.04 | 2 | 5.82 | 0 | 2 | 5.95 | 0 | 2 | 6.02 0 | 2 | 5.97 | 0 |
| | | 3 | 6.03 | 0.01 | 3 | 5.87 | −0.01 | 3 | 5.95 | 0 | 3 | 6.00 | 0.02 | 3 | 5.96 | 0.01 |
| | | 4 | 6.02 | 0.02 | 4 | 5.87 | −0.01 | 4 | 5.95 | 0 | 4 | 5.95 | 0.07 | 4 | 5.95 | 0.02 |
| | | 5 | 5.99 | 0.05 | 5 | 5.87 | −0.01 | 5 | 5.95 | 0 | 5 | 5.86 | 0.16 | 5 | 5.92 | 0.05 |
| | | 6 | 5.95 | 0.01 | 6 | 5.87 | −0.01 | 6 | 5.95 | 0 | 6 | 5.79 | 0.03 | 6 | 5.89 | 0.05 |
| | | 7 | 5.93 | 0.11 | 7 | 5.87 | −0.01 | 7 | 5.95 | 0 | 7 | 5.78 | 0.24 | 7 | 5.85 | 0.12 |
| | | 8 | 5.91 | 0.13 | 8 | 5.87 | −0.01 | 8 | 5.95 | 0 | 8 | 5.77 | 0.25 | 8 | 5.82 | 0.15 |
| | | 9 | 5.91 | 0.13 | 9 | 5.87 | −0.01 | 9 | 5.95 | 0 | 9 | 5.76 | 0.26 | 9 | 5.82 | 0.15 |
| | | 10 | 5.90 | 0.14 | 10 | 5.86 | 0 | 10 | 5.95 | 0 | 10 | | | 10 | 5.81 | 0.16 |
| | | 11 | 5.90 | 0.14 | 11 | 5.86 | 0 | 12 | 5.95 | 0 | 11 | 5.75 | 0.27 | 11 | 5.81 | 0.16 |
| | | 15 | 5.88 | 0.16 | 15 | 5.87 | −0.01 | 15 | 5.95 | 0 | | | | 15 | 5.80 | 0.17 |
| | | 29 | 5.87 | 0.17 | 29 | 5.87 | −0.01 | 29 | 5.94 | 0.01 | 35 | 5.73 | 0.29 | 31 | 5.78 | 0.19 |

U4A15 = U destabilized 1997 56%, 4 Fraction #4 150-200 mL, A = 1st destabilized, 15 = 1,4,10,13 tetroxa-7,16-diazaby-clooctadecene 104.3 mg/10 mL 29,580-9
U4A13 = U destabilized, ect, ect, 13 = 4,5-dihydroxy-1,3 benzene disulfonic acid, disodiumsalt 106.3 mg/10 mL 12,255-3
U4A9 = U destabilized, 9 = 1,4,8,11 Tetraazacyclotetra-decane-1,4,8,11-tetraacetic acid 100.9 mg/10 mL H₂O 40,040 mg
1997SW = stabilized, water
U4AW = destabilized, Fraction 4, A, water Gas Evolution

| | 1997SW | | Aldrich 50% HA | | U4AW | | U4A16 | | U4A22 | |
|---|---|---|---|---|---|---|---|---|---|---|
| 2 mL Fe(III) 5000 ppm | 1.97 mg | | 2.02 | | 1.89 mg | | 2.16 mg | | 1.87 mg | |
| 100 mL water or new stabilizer | 102.4 mg H₂O | | 101.2 mg H₂O | | 101.6 mg H₂O | | 100.5 mg 16 | | 99.5 mg 22 | |
| 1 mL HA | 1221 | | 1209.7 | | 1195 mg | | 1200 | | 1194 | |
| Vial | 4.88 g | | 4.84 g | | 4.85 | | 4.82 | | 4.92 | |
| 0 | 6.06 | | 0 | 5.99 | 0 | 5.98 | 0 | 5.94 | 0 | 6.09 |
| 1 | 6.05 | 0.01 | 1 | 5.99 | 0 | 1 | 5.98 | 0 | 1 | 5.94 | 0 | 1 | 6.09 | 0 |
| 2 | 6.04 | 0.02 | 2 | 5.99 | 0 | 2 | 5.98 | 0 | 2 | 5.94 | 0 | 2 | 6.09 | 0 |
| 3 | 6.04 | 0.02 | 3 | 5.99 | 0 | 3 | 5.96 | 0.02 | 3 | 5.94 | 0 | 3 | 6.09 | 0 |
| 4 | 6.02 | 0.04 | 4 | 5.98 | 0.01 | 4 | 5.95 | 0.03 | 4 | 5.94 | 0 | 4 | 6.08 | .01 |
| 5 | 5.98 | 0.08 | 5 | 5.98 | 0.01 | 5 | 5.91 | 9.07 | 5 | 5.94 | 0 | 5 | 6.07 | .02 |
| 6 | 5.88 | 0.18 | 6 | 5.98 | 0.01 | 6 | 5.87 | 0.11 | 6 | 5.94 | 0 | 6 | 6.07 | .02 |
| 7 | 5.82 | 0.24 | 7 | 5.97 | 0.02 | 7 | 5.86 | 0.12 | 7 | 5.94 | 0 | 7 | 6.07 | .02 |
| 8 | 5.29 | 0.27 | 8 | 5.95 | 0.04 | 8 | 5.85 | 0.13 | 8 | 5.94 | 0 | 8 | 6.06 | .03 |
| 9 | | | 9 | 5.95 | 0.04 | 9 | 5.84 | 0.14 | 9 | 5.94 | 0 | 9 | 6.06 | .03 |
| 10 | 5.78 | 0.28 | 10 | 5.94 | 0.05 | 10 | 5.84 | 0.14 | 10 | 5.94 | 0 | 10 | 6.06 | .03 |
| | | | 14 | 5.88 | 0.11 | | | | | | | | | |
| | | | 15 | 5.87 | 0.12 | 16 | 5.83 | 0.16 | 15 | 5.94 | 0 | 15 | 6.06 | 0.04 |
| 20 | 5.76 | 0.30 | 20 | 5.83 | 0.16 | 20 | 5.81 | 0.15 | 20 | 5.94 | 0 | 20 | 6.03 | 0.05 |

1997SW = 1997 stabilized + H₂O
Aldrich = Aldrich + H₂O
U4AW = 1997 destabilized Fraction 4, A = 1st, water
U4A16 = Ethylenebis(oxyethylenenitrilo)tetraacetic 99.4 mg/10 mL H₂O 40991-0250
U4A22 = 1,4,8,11-Tetraazacyclotetradecane-5,7-dione 102 mg/10 mL 33,316-6

Gas Evolution Testing of New Stabilizers

| | 1997SW | 1997S28 | 1997S29 | 1997S14 | 1997S23 | 1997S4 |
|---|---|---|---|---|---|---|
| 2 mL Fe(II) 5000 ppm Fe | 1.61 mg | 1.76 mg | 1.84 mg | 1.92 | 1.97 | 2.00 |
| 100 mL water | 100.5 mg | 100 mg | 101.6 mg | 97.2 | 101.9 | 96.3 |

-continued

|  | 1997SW | | 1997S28 | | 1997S29 | | 1997S14 | | 1997S23 | | 1997S4 | |
|---|---|---|---|---|---|---|---|---|---|---|---|---|
| or New Stabilizer | | | 28 | | | | | | 23 | | 4 | |
| 1 mL HA | 1225 | | 1220 mg | | 1221 mg | | 1221 | | 1230 | | 1222 | |
| Vial | 4.85 | | 4.81 | | 4.87 | | 4.85 | | 4.91 | | 4.85 | |
| Time 0 | 6.06 | | 5.98 | | 6.06 | | 6.06 | 0 | 6.14 | 0 | 6.07 | |
| min 1 | 6.06 | 0 | 5.98 | | 6.06 | | 6.06 | 1 | 6.14 | 0 | 6.06 | .01 |
| 2 | 6.05 | .01 | 5.97 | .01 | 6.05 | .01 | 6.07 | −.01 2 | 6.14 | 0 | 6.06 | .01 |
| 3 | 6.04 | .02 | 5.96 | .02 B | 6.05 | .01 B | 6.06 | 0 3 | 6.14 | 0 | 6.06 | .01 |
| 4 | 6.04 | .02 | 5.95 | .03 B | 6.03 | .03 | 6.06 | 0 4 | 6.14 | 0 | 6.06 | .01 |
| 5 | 6.00 | .06 | 5.89 | .09 VB | 6.00 | .06 VB | 6.06 | 0 5 | 6.14 | 0 | 6.06 | .01 |
| 6 | 5.91 | .15 | 5.83 | .15 VB | 5.96 | .10 VB | 6.04 | .02 6 | 6.14 | 0 | 6.06 | .01 |
| 7 | 5.81 | .25 | 5.79 | .19 B | 5.94 | .12 VB | 6.04 | .02 7 | 6.14 | 0 | 6.06 | .01 |
| 8 | 5.75 | .31 | 5.77 | .21 B | 5.12 | .14 B | 6.03 | .03 8 | 6.14 | 0 | 6.06 | .01 |
| 9 | 5.25 | .31 | 5.76 | .22 | 5.90 | .16 | 6.01 | .05 9 | 6.14 | 0 | 6.06 | .01 |
| 10 | 5.75 | .31 | | | 5.89 | .17 | 6.00 | .06 10 | 6.14 | 0 | 6.06 | .01 |
| 15 | 5.73 | .33 | 5.75 | .23 | 5.86 | .20 11 | 5.93 | .13 15 | 6.14 | 0 | 6.06 | .01 |
| 20 | 5.72 | .34 | 5.75 | .23 | 5.85 | .21 12 | 5.89 | .17 20 | 6.14 | 0 | 6.06 | .01 |
|  |  |  |  |  |  | 13 | 5.82 | .24 | | | | |
| wt loss | 0.34 g | | 0.23 g | | 0.21 g | 14 | 5.78 | .29 | wt loss = 0 | | wt loss = 0.01 | |
|  |  |  |  |  |  | 15 | 5.77 | .29 | | | | |

1997SW = 1997 Stabilized + 100 mL $H_2O$
1997S28 = 1997 Stabilized + 100 mL Polystyrene sulfononic acid-comaleicacid sodiumsalt   102.5 mg/10 mL
1997S29 = 1997 Stabilized + 100 mL Polyacrylic acid sodium salt 40%   304.8 mg/10 mL
1997S14 = 1997 Stabilized + 100 mL 2,5-dihydroxy-1,4-benzenediaceticacid   107.4 mg/10 mL
1997S23* = 1997 Stabilized + 100 mL CDTA   105 mg/10 ml $H_2O$
1997S4* = 1997 Stabilized + 100 mL FLUOREXON   101.3 mg/10 ml $H_2O$
*little or no wt loss: little or no decomposition
B = Bubbles
V = Vigorous Gas Evolution

|  | U4A17 | | U4A21 | | U4A19 | | U4A23 | | 1997S23 | |
|---|---|---|---|---|---|---|---|---|---|---|
| 2 mL Fe(III) 5000 ppm Fe[13] | 1.86 mg | | 1.90 | | 1.90 | | 1.25 | | 1.80 | |
| 100 mL $H_2O$ or New Stabilizer | 100.9 mg 17 | | 101.3 21 | | 100.6 19 | | 11.8 23 98.8 $H_2O$ | | 11.4 mg 23 99.9 mg $H_2O$ | |
| 1 mL HA | 1191 mg | | 1194 | | 1191 | | 1189 | | 1224 | |
| Vial | 4.96 | | 4.93 | | 4.85 | | 4.84 | | 4.85 | |
| 0 | 6.08 | | 0 6.10 | | 0 6.01 | | 0 6.01 | | 0 6.05 | |
| 1 | 6.07 | 0.01 | 1 6.10 | 0 | 1 6.01 | 0 | 1 6.01 | 0 | 1 6.05 | 0 |
| 2 | 6.08 | 0 | 2 6.10 | 0 | 2 6.01 | 0 | 2 6.01 | 0 | 2 6.05 | 0 |
| 3 | 6.06 | 0.02 | 3 6.09 | 0.01 | 3 6.01 | 0 | 3 6.01 | 0 | 3 6.05 | 0 |
| 4 | 6.04 | 0.04 | 4 6.08 | 0.02 | 4 6.01 | 0 | 4 6.01 | 0 | 4 6.05 | 0 |
| 5 | 6.02 | 0.06 | 5 6.05 | 0.05 | 5 6.01 | 0 | 5 6.01 | 0 | 5 6.05 | 0 |
| 6 | 6.00 | 0.08 | 6 6.01 | 0.09 | 6 6.01 | 0 | 6 6.01 | 0 | 6 6.05 | 0 |
| 7 | 5.99 | 0.09 | 7 5.98 | 0.12 | 7 6.01 | 0 | 7 6.01 | 0 | 7 6.05 | 0 |
| 8 | 5.97 | 0.11 | 8 5.97 | 0.13 | 8 6.01 | 0 | 8 6.01 | 0 | 8 6.05 | 0 |
| 9 | 5.96 | 0.12 | 9 5.96 | 0.14 | 9 6.01 | 0 | 9 6.01 | 0 | 9 6.05 | 0 |
| 10 | 5.95 | 0.13 | 10 5.95 | 0.15 | 10 6.01 | 0 | 10 6.01 | 0 | 10 6.05 | 0 |
| 15 | 5.94 | 0.14 | 15 5.94 | 0.16 | 15 6.01 | 0 | 15 6.01 | 0 | 15 | |
| 20 | 5.93 | 0.15 | 20 5.93 | 0.17 | 20 6.01 | 0 | 20 | | 20 6.05 | 0 |

U4A17 U = unstabilized 1997, 4$^{th}$ Fraction,   99 mg/10 mL $H_2O$
A 1$^{st}$, 17 N,N' dicarbocymethyl-diaza-28-crown-6
U4A21 = Krypto Fix 222   106.4 mg/10 mL $H_2O$
U4A19 = Diethylenetriaminepentaacetic acid 28,556-0   101.4 mg/10 mL
UA23 = CDTA   105 mg/10 ml $H_2O$

|   | 1997SW | U4AW | U4A26 | U4A25 | U4A24 | U4A11 | U4A14 |
|---|---|---|---|---|---|---|---|
| 2 mL Fe(III) 5000 ppm Fe[13] | 1.94 | 1.89 | 1.97 | 1.99 | 1.99 | 1.79 | 1.88 |
| 100 mL $H_2O$ or New Stabilizer | 100.6 mg | 99.8 | 99.7 26 | 101 | 95.5 25 | 99.1 11 | 98.9 mg 14 |
| 1 mL HA | 1221 mg | 1195 | 1188 | 1203 | Green/ Yellow | 1207 Amber |   |
| Vial | 4.84 | 4.84 | 4.95 | 4.95 | 4.87 | 4.84 | 4.93 |
| 0 | 6.04 | 5.99 | 6.11 | 6.07 | 6.02 | 6.00 0 | 6.07 |
| 1 | 6.04 | 5.99 0 | 6.11 0 | 6.07 | 6.02 0 | 6.00 0 | 6.07 |
| 2 | 6.04 | 5.99 0 | 6.12 −.01 | 6.07 | 6.02 0 | 6.00 0 | 6.07 |
| 3 | 6.03 .01 | 5.98 .01 | 6.11 0 | 6.07 | 6.02 0 | 6.00 0 | 6.06 .01 |
| 4 | 6.02 .02 | 5.97 .02 | 6.11 0 | 6.07 | 6.02 0 | 6.00 0 | 6.06 .01 |
| 5 | 5.97 .02 | 5.93 .06 | 6.11 0 | 6.07 | 6.02 0 | 6.00 0 | 6.05 .02 |
| 6 | 5.87 .17 | 5.91 .08 | 6.11 0 | 6.06 .01 | 6.02 0 | 5.99 .01 | 6.05 .02 |
| 7 | 5.80 .24 | 5.89 .10 | 6.11 0 | 6.06 .01 | 6.02 0 | 6.00 .01 | 6.04 .03 |
| 8 | 5.78 .26 | 5.87 .12 | 6.11 0 | 6.06 .01 | 6.02 0 | 6.00 0 | 6.03 .04 |
| 9 | 5.77 .27 | 5.86 .13 | 6.12 −.01 | 6.05 .02 | 6.02 0 | 6.00 0 | 6.02 .05 |
| 10 | 5.76 .28 | 5.86 .13 | 6.11 0 | 6.05 .02 | 6.02 0 | 6.00 0 | 6.01 .06 |
| 15 | 5.75 .29 | 5.83 .16 | 6.11 0 | 6.04 .03 | 6.02 0 | 5.99 .01 | 5.98 .09 |
| 20 | 5.75 .29 | 5.83 .16 | 6.12 −.01 | 6.04 .03 | 6.02 0 | 5.99 .01 | 5.97 .10 |

1997SW 1997 stabilized water
U4AW 1997 destabilized + water
U4A26* 1997 destabilized + triethylenetetraamine, N,N,N',N'',N''',N'''' hexaacetic acid    105.6 mg/10 mL
U4A25 1997 destabilized + inositole hexa-phosphoric acid 40-50%    187 mg/10 mL
U4A24* 4,8 dihydroxyguinoline-2-carboxylic acid    99.6 mg/10 mL
U4A11* 4,7 dihydroxy-1,10-phenanthroline    51.3 mg/10 mL
UA414 2,5 dihydroxy-1,4-benzenediacetic acid    107.4 mg/10 mL General Titration Procedure Determination of remaining $NH_2OH$ after gas evolution Test: General Procedure: First wash contents of 10 mL plastic beaker with 2 mL conc HCl+5 mL $H_2O$, transfer HCl+washings to 200 ml Volumetric Flask. After completion of-the gas evolution experiment, transfer contents of 4 mL Vial to 200 mL Volumetric Flask. Add 2 ml HCl to Vial wash with 10-20 mL $H_2O$, Transfer all washings to 200 mL volumetric Flask. Dilute up to Volume. Take 10 mL aliquot and titrate with 0.25 N NaOH. From page 27 calculation for HA=Hydroxylamine 1 mL $\hat{=}$ 1.1 g $$mL \times \frac{.25 \text{ mole}}{1000 \text{ mL}} \times \frac{1}{1.1 \text{ g}} \times \frac{33 \text{ g}}{\text{mole}} \times \frac{200 \text{ mL}}{10 \text{ mL}} \times 100 = \% \text{ HA or mL} \times 15$$

1997SW=1 mL 1997 Stabilized+100 ml $H_2O$+2 mL $Fe^{+3}$ (5000 ppm)

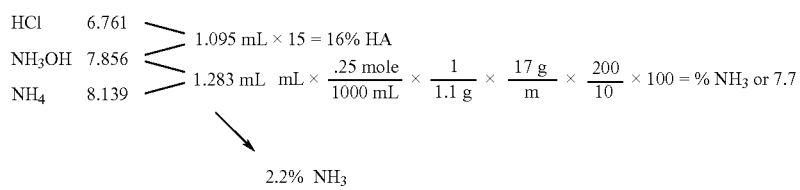

1997S28=Inl 1997 Stabilized+100 mL Polystyrenesulfonate-co-maleic acid, sodium salt+2 mL ($Fe^{+3}$ 5000 ppm)

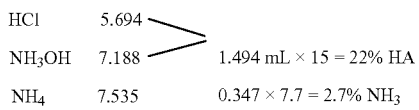

1997S29=1 mL 1997 stabilized+100 ml of $\hat{=}$10000 ppm polyacrylic acid sodium salt 40% 304.8 mg/10 mL+2 ml of Fe(III) 5000 ppm 1997S23 = 1 mL 1997 stabilized + 100 mL of CDTA 105 mg/10 mL, 2 mL of Fe(III) 5000 ppm HCl      4.436 ml  ⟩ 2-1 1.193 mL × 13 = 17.9% HA
NH₃OH   5.629 ml  ⟩ 3-2 0.563 mL × 27 = 4.3% NH₃
NH₄      6.192 ml HCl      3.541  ⟩ 3.683 mL × 15 = 55.2% HA
NH₃OH   7.224  ⟩ NO NH₃
NH₄

1997S14 = 1 mL 1997 stabilized + 100 mL of 2,5 dihydroxy-1,4-benzenediacetic aicd 107.4 mg/10 mL, +2 mL of Fe(III) 5000 ppm 1997S4 = 1 mL 1997 stabilized + 100 mL of Fluorexon (11,985-7 Cat# Aldrich 101.3 mg/10 mL + 2 mL of Fe(III) 5000 ppm HCL      3.565  ⟩ = 3.581 mL × 13 = 53.7% HA
NH₃OH   7.146

HCl      7.022  ⟩ 2-1 0.813 mL × 15 = 12.2% HA
NH₃OH   7.835  ⟩ 3-2 0.327 mL × 7.7 = 2.52% NH₃
NH₄      1.162

HA = hydroxyl amine Note 1997S23 + 19974 showed little or no decomposition

Gas Evolution

| 2 mL Fe(III) 500 ppm | 1997S32 | | 1997S31 | |
|---|---|---|---|---|
|  | 1.97 mg | | 1.93 mg | |
| 100 mL H₂O or New Stabilizer | 101 mg | | 101.3 mg | |
| 1 mL of 1997S Σ | 1218 mg | | 1222 mg | |
| Vial empty | 4.93 g | | 4.89 | |
|  | 0 | 6.10 | 0 | 6.09 |
|  | 1 |  | 1 | 6.09 |
|  | 2 | 6.10 | 2 | 6.09 B |
|  | 3 | 6.08 B | 3 | 6.08 |
|  | 4 | 6.08 B | 4 | 6.06 VB |
|  | 5 | 6.05 VB | 5 | 6.03 VB |
|  | 6 | 6.02 VB | 6 | 5.93 |
|  | 7 | 6.00 VB | 7 | 5.83 VB |
|  | 8 | 5.98 | 8 | 5.77 VB |
|  | 9 | 5.97 | 9 | 5.75 |
|  | 10 | 5.95 | 10 | 5.74 |
|  | 15 | 5.91 | 15 | 5.73 |
|  | 20 | 5.89 | 20 | 5.72 |
|  | wt loss | 0.21 g | wt loss | 0.37 |
| 1997S32 = 1 mL 1997S | | | 1997S31 = 1 mL 1997S | |
| 113 mg/10 mL 1,2bis(2 amino phenoxy) ethane N,N,N',N' tetacetic acid | | | 100 ml of Trans-Aconitric acid 105 mg/10 mL | |

HCL         6.810
NH₃OH    7.969  $\Big\rangle$ 1.159 mL × 15 = 17.4% HA
NH₄         8.577  $\Big\rangle$ 0.602 mL × 7.7 = 4.7% NH₃
HCL         7.336
NH₃OH    8.176  $\Big\rangle$ 0.84 × 15 = 12.6% HA
NH₄         8.466  $\Big\rangle$ 0.29 × 7.7 = 2.2% NH₃

B = Bubbles
V = Vigorous

Gas Evolution+Titration

|  | Sample | | |
| --- | --- | --- | --- |
|  | 1997S34 | 1997S35 | HA = Hydroxylamine |
| 2 mL Fe(III) 5000 ppm | 1.98 mg | 1.98 mg | Note 1997S35 |
| 100 mL New Stabilizer | 101 mg | 102.5 mg | little or NO wt loss |
| 1 mL 1997S Σ | 1229 mg | Σ 1225 mg | in little or NO HA |
| Vial empty | 4.90 g | 4.82 g | decomposition |
|  | Time Min | Time Min |  |
|  | 0    6.12 | 0    6.05 |  |
|  | 1    6.12 | 1    6.05 |  |
|  | 2    6.11 | 2    6.05 |  |
|  | 3    6.10 B | 3    6.05 |  |
|  | 4    6.09 | 4    6.05 |  |
|  | 5    6.04 VB | 5    6.05 |  |
|  | 6    5.92 | 6    6.05 |  |
|  | 7    5.84 VB | 7    6.05 |  |
|  | 8    5.82 | 8    6.04 B |  |
|  | 9    5.81 | 9    6.04 |  |
|  | 10   5.80 | 10   6.05 |  |
|  | 15   5.79 | 15   6.04 |  |
|  | 20   5.79 | 20   6.03 |  |
|  | wt loss 0.33 g | wt loss 0.02 g |  |
| 1 mL 1997S | 1 mL 1997S |  |  |
| 100 mL 34 = 1,1'-Ethylenebis(5-oxo-3- | 100 mL 109 mg |  |  |
| pyrrolidine carboxylic acid Cat# 32, 756-S | 2,3 dihydroxybenzoic |  |  |
| Alrich | acid |  |  |

HCl         6.930
NH₃OH    7.983  $\Big\rangle$ 1.153 mL × 15 = 15.8% HA
NH₄         8.305  $\Big\rangle$ 0.322 mL × 7.7 = 2.47% NH₃

B = Bubbles
V = Vigorous

HCL         5.042
NH₃OH    8.348  $\Big\rangle$ 3.306 mL × 15 = 49.6% HA
NH_Y       8.331  $\Big\rangle$ 0.203 mL × 7.7 = 1.56% NH₃ slight Color, Note splash
of Vial contents on addition of HCl

Gas Evolution+Titration

| | sample | | | | |
|---|---|---|---|---|---|
| | 1997S33 | 1997S19 | 1997S36 | 1997S40 | 1997S26 |
| 5000 ppm Fe 2 mL | 2.17 mg | 2.43 mg | 2.09 mg | 2.11 mg | 1.98 mg |
| 100 mL New Stabilizer Σ | 101.8 mg | Σ 101.6 mg | 100.8 mg | 101 mg | 100 mg |
| 1 mL 1997S Σ | Σ 1225 mg | Σ 1224 mg | Σ 1220 mg | 1220 mg | 1220 mg |
| Vial empty | 4.93 g | 4.88 g | 4.88 g | 4.82 g | 4.85 g |
| Time Minutes | | | | | |
| 0 | 6.13 g | 6.09 g | 6.10 g | 5.95 g | 6.07 g |
| 1 | 6.13 g | 6.10 g | 6.10 g | 5.95 g | 6.07 g |
| 2 | 6.13 g | 6.10 g | 6.10 g | 5.95 g | 6.07 g |
| 3 | 6.12 g B | 6.10 g | 6.10 g | 5.94 g | 6.07 g |
| 4 | 6.10 g | 6.10 g | 6.10 g | 5.92 g VB | 6.07 g |
| 5 | 6.03 g VB | 6.10 g | 6.10 g | 5.89 g VB | 6.07 g |
| 6 | 5.93 g VB | 6.10 g | 6.10 g | 5.83 g VB | 6.07 g |
| 7 | 5.88 g VB | 6.10 g | 6.10 g | 5.78 g VB | 6.07 g |
| 8 | 5.86 g | 6.10 g | 6.10 g | 5.75 g | 6.07 g |
| 9 | 5.85 g | 6.10 g | 6.10 g | 5.73 g | 6.07 g |
| 10 | 5.85 g | 6.10 g | 6.10 g | 5.73 g | 6.07 g |
| 15 | 5.84 g | 6.09 g | 6.10 g | 5.71 g | 6.07 g |
| 20 | 5.84 g | 6.10 g | 6.10 g | 5.70 g | 6.07 g |
| | wt 0.29 g loos | wt 0 g loss | wt 0 g loss | wt 0.25 g loss | wt 0 g loss |

1997S33 = 1 mL 1997s + 100 mL 2,2'-(Ethylenedithio)diacetic acid 103 mg/10 mL, 2 mL pf 5000 ppm Fe 1997S33=1 mL 1997S+100 mL 2,2'-(Ethylenedithio)diacetic acid 103 mg/10 mL, 2 mL of 5000 ppm Fe HCl 4.936
$+$
$NH_3OH$ 6.115
$+$
$NH_4$ 6.441

1.179 mL × 15 = 17.7% HA
0.326 mL × 7.7 = 2.5% $NH_3$

Note 1997S19, 1997S36+1997S26 showed little or no wt loss in little or no decomposition Gas Evolution+Titration
1997S19=1 mL 1997 Stabilized, 100 mL of Diethylene triamine pentaacetic acid (28,556-0 cat# Aldrich) 101.4 mg/10 mL, 2 mL of 5000 ppm Fe HCl 4.800
$NH_3OH$ 8.534
$NH_4$ None 3.734 mL × 15 = 56.0% HA = hydroxyl amine
Note Little or no Decomposition of 1997S 1997S36=1 mL 1997 Stabilized, 100 mL of N,N'-Bis(2-carboxyethyl)-N,N'ethylenediglycine trihydrate (Aldrich 28,584-6)

HCl 4.769
$+$
$NH_3OH$ 8.403
$+$
$NH_4$ None 3.634 mL × 15 = 54.5% HA
Note Little or no Decomposition of 1997S 1997S40=1 mL 1997 stabilized, 100 mL 1,2,3,4 Butane-tetracarboxylic acid 105.9 mg/10 mL, 2 mL of 5000 ppm Fe HCl 6.367
$NH_3OH$ 7.620
$NH_4$ 8.014

1.253 × 15 = 18.8% HA
0.394 × 7.7 = 3% $NH_Y^+$

1997S26=1 mL 1997 Stabilized, 100 mL Triethylenetetramine N,N,N,N, hexaacetic acid HCl 4.928
$+$
$NH_3OH$ 8.561
$+$
$NH_4$ = 3.633 mL × 15 = 54.5% HA no $NH_3$ Little or no Decompositon of 1997S Gas Evolution+Titration

| | sample | | | | | | |
|---|---|---|---|---|---|---|---|
| | 1997S9 | 1997S13 | 1997S16 | 1997S22 | 1997S24 | 1997S11 | 1997S25 |
| 5000 ppm Fe 2 mL | 1.72 mg | 2.07 | 1.70 | 2.02 | 1.89 | 1.76 | 2 |
| New Stabilizer 100 mL | Σ 101.4 mg | 101.9 Green Color | 101.2 | 100 | 99.7 Greenish Color | 98.4 Redish | 99 |
| 1997S H-Base 55% HA 1 mL | Σ 1220 mg | 1221 Rose Color | 1220 | 1222 | 1218 Yellow | 1215 | 1224 |
| Vial Empty Time (Min.) | 4.86 | 4.90 | 4.83 | 4.89 | 4.85 | 4.95 | 4.83 |
| 0 | 6.05 | 6.12 | 6.07 | 6.10 | 6.04 | 6.11 | 6.07 |
| 1 | 6.05 | 6.12 | 6.07 | 6.10 | 6.04 | 6.11 | 6.07 |
| 2 | 6.05 | 6.12 | 6.07 | 6.09 | 6.04 | 6.11 | 6.07 |
| 3 | 6.05 | 6.12 | 6.07 | 6.08 B | 6.04 | 6.11 | 6.07 |
| 4 | 6.05 | 6.12 | 6.07 | 6.08 | 6.04 | 6.11 | 6.08 |
| 5 | 6.05 | 6.12 | 6.07 | 6.07 | 6.04 | 6.11 | 6.07 |
| 6 | 6.05 | 6.12 | 6.07 | 6.07 | 6.04 | 6.11 | 6.07 |
| 7 | 6.05 | 6.12 | 6.07 | 6.06 | 6.04 | 6.11 | 6.05 |
| 8 | 6.05 | 6.12 | 6.07 | 6.06 | 6.04 | 6.11 | 6.04 |
| 9 | 6.05 | 6.12 | 6.07 | 6.06 | 6.04 | 6.11 | 6.04 |
| 10 | 6.05 | 6.12 | 6.07 | 6.05 | 6.04 | 6.11 | 6.03 |
| 15 | 6.05 | 6.12 | 6.07 | 6.04 | 6.04 | 6.11 | 5.98 |
| 20 | 6.05 | 6.12 | 6.07 | 6.04 | 6.04 | 6.10 | 5.95 |
| wt loss | 0 | 0 | 0 | .06 mg | 0 | .01 | 0.12 g |

| sample | 1997S13 | | 0 | 6.06 |
|---|---|---|---|---|
| 5000 ppm | | | 1 | 6.06 |
| 2 mL Fe | 2.00 | | 2 | 6.06 |
| New | | | 3 | 6.06 |
| Stabilizer | 100.3 | | 4 | 6.05 |
| 1997S | | | 5 | 6.05 |
| HB | 1220 | | 6 | 5.92 |
| | | | 7 | 5.82 |
| Vial | 4.87 | | 8 | 5.80 |
| | | | 9 | 5.79 |
| | | | 10 | 5.79 |
| | | | 15 | 5.79 |
| | | | 20 | 5.79 |

1997S9=1 mL 1997 Stabilized HBase 55% HA, 100 mL of 1,4,8,11 Tetraazacyclotetradecane-1,4,8,11-tetracetic acid (Aldrich 40,040-8) 100.9 mg/10 mL H$_2$O, 2 mL of 5000 ppm Fe(III)

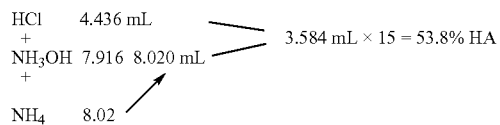

1997S13=1 mL 1997 Stabilized HB 55% HA, 100 mL of 4,5 Dihydroxy-1,3-benzene disulfonic Acid, disodiumsalt (Aldrich 17,255-3) 106.3 mg/10 mL H$_2$O, 2 mL 5000 ppm Fe(III)

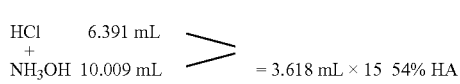

1997S 16=1 mL 1997 Stabilized HB 55% HA, 100 mL of Ethylene bis(oxyethylenenitriolo)-tetraacetic acid (40991-0250) 99.4 mg/10 mg H$_2$O, 2 mL of 5000 ppm Fe(III)

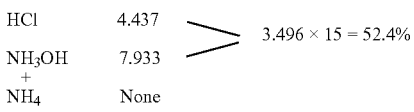

1997S22=1 mL 1997 Stabilized HBase 55% HA, 100 mL of 1,4,8,11-tetraazacycloetradecane-5,7-dione (33,316-6 cat#) 102 mg/10 mL, 2 mL of 5000 ppm Fe

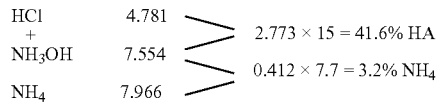

1997S24=1 mL 1997 Stabilized HBase 55% HA, 100 mL of 4,8-Dihydroxy quinoline-2-carboxylic acid 99.6 mg/10 mL, 2 mL of 5000 ppm Fe

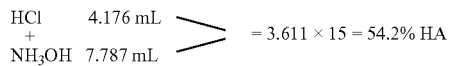

1997S11=1 mL 1997 Stabilized HBase 55% HA, 100 mL of 4,7 dihydroxy 1,10 phenanthroline 51.3 mg/10 mL, 2 mL of 5000 ppm Fe(III)

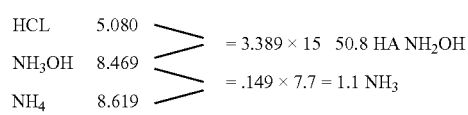

1997S25=1 mL 1997 Stabilized HBase 55% HA, 100 mL of Inositol hexaphosphoric acid (40-50% Sol'n) 187 mg/10 mL, 2 mL of 5000 ppm Fe

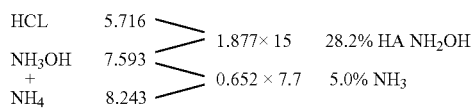

1997S15=1 mL 1997 Stabilized HBase 55% HA, 100 mL of 1,4,10,13-tetroxa-7,16-diazacyclooctadecane (29,580-9 Aldrich) 104.3 mg/1 mL $H_2O$, 2 mL of 5000 ppm Fe

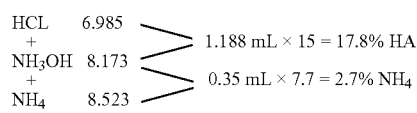

Gas Evolution+Titration of New Stabilizer

1997S41=1 mL 1997 Stabilized HBase 56% HA, 100 mL of (±)Cis-Epoxytricarbollylic acid 100 mg/10 mL, 2 mL of 5000 ppm FE(III) vial+¾ mL HCl→200 mL, 10 mL aliquot

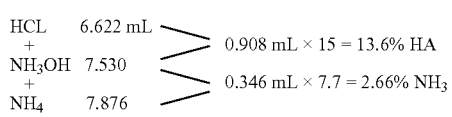

1997S42=1 mL 1997 Stabilized HBase 56% HA, 100 mL of N-(2-Acetamidaminodiacetic acid 105 mg/10 mL, 2 ml of 5000 ppm Fe(III)

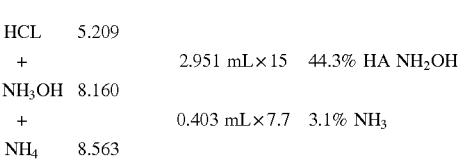

1997S39=1 mL 1997S Stabilized 56% HA, 100 mL of Salicylic Acid 7.8 mg/10 mL, 2 mL of Fe(III) 5000 ppm

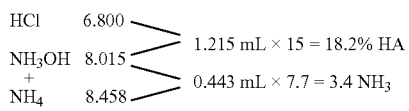

|  | sample | | | | |
|---|---|---|---|---|---|
|  | 1997S41 | 1997S42 | 1997S39 | 1997S38 | 1997S37 |
| 5000 ppm Fe 2 mL | 1.94 mg | 2.09 mg | 1.70 mg | 2.07 mg | 2.22 mg |
| New Stabilizer 100 mL | Σ 1023 mg | 97.7 mg | 100.4 mg red | 100 mg Green | 100 mg |
| 1997S 56% HA 1 mL | Σ 1224 mg | 1221 mg | 1238 mg light yellow | 1224 mg light orange | 1238 mg |
| empty Vial | 4.85 g | 4.87 g | 4.95 g | 4.82 g | 4.88 g |
| Time (Min.) | | | | | |
| 0 | 6.06 | 6.08 | 6.17 | 6.05 | 6.11 |
| 1 | 6.06 | 6.08 | 6.17 | 6.05 | 6.11 |
| 2 | 6.06 | 6.08 | 6.17 | 6.05 | 6.11 |
| 3 | 6.06 | 6.08 | 6.16 | 6.05 | 6.11 |
| 4 | 6.04 | 6.08 | 6.14 | 6.05 | 6.11 |
| 5 | 6.03 | 6.07 | 6.11 | 6.05 | 6.11 |
| 6 | 5.98 | 6.07 | 6.05 | 6.05 | 6.11 |
| 7 | 5.88 | 6.07 | 5.99 | 6.05 | 6.11 |
| 8 | 5.82 | 6.06 | 5.95 | 6.05 | 6.11 |
| 9 | 5.78 | 6.06 | 5.94 | 6.05 | 6.11 |
| 10 | 5.76 | 6.06 | 5.93 | 6.05 | 6.11 |
| 15 | 5.75 | 6.05 | 5.92 | 6.05 | 6.11 |
| 20 | 5.74 | 6.04 | 5.91 | 6.05 | 6.11 |
| wt loss | 0.32 g | 0.04 g | 0.26 g | 0 mg | 0 g |

1997S38=1 mL 1997S Stabilized 56% HA, 100 mL of Thiosalicylic acid 101.6 mg/1 mL, 2 mL of 5000 ppm Fe(III)

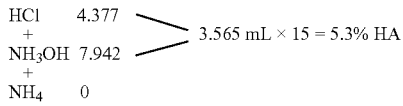

HCl 4.377
+
NH$_3$OH 7.942    → 3.565 mL × 15 = 5.3% HA
+
NH$_4$ 0

1997S37=1 mL 1997S Stabilized 56% HA, 100 mL of CDTA 112 mg/10 mL, 2 mL of 5000 ppm Fe(III)

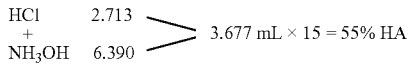

HCl 2.713
+         → 3.677 mL × 15 = 55% HA
NH$_3$OH 6.390

New Stabilizer Screening

Gas Evolution+Titration

|  |  | sample | | |
|---|---|---|---|---|
|  |  | 1997S43 | 1997S45 | 1007S46 |
| 2 mL 500 ppm Fe(III) |  | 1.80 mg | 100 mg | 1.93 |
| new stabilizer 100 mL |  | 100 mg | 100 mg | 100.7 |
| 1997S H-base 56% |  | 1223 mg | 1229 mg | 1232 |
| Hydroxylamine |  |  |  |  |
| Vial | min | 4.83 g | 4.91 g | 4.92 g |
|  | 0 | 6.06 | 6.11 | 6.15 |
|  | 1 | 6.06 | 6.11 | 6.15 |
| Note: After wt loss content | 2 | 6.06 | 6.12 | 6.15 |
| of vial transferred to 200 mL | 3 | 6.05 | 6.12 | 6.15 |
| Volumetric Flask, 3-4 mL | 4 | 6.04 | 6.12 | 6.15 |
|  | 5 | 6.02 | 6.12 | 6.15 |
| Conc HCl Aldrich, diluted | 6 | 6.00 | 6.12 | 6.15 |
|  | 7 | 5.98 | 6.12 | 6.15 |
| to volume, 10 mL aliquot | 8 | 5.95 | 6.12 | 6.15 |
| titrated using 0.25 NaOH | 9 | 5.93 | 6.12 | 6.15 |
|  | 10 | 5.91 | 6.12 | 6.15 |
|  | 15 | 5.88 | 6.12 | 6.15 |
|  | 20 | 5.86 | 6.12 | 6.15 |
| wt loss |  | 0.20 g | 0 g | 0 g |

1997S43=1 mL 1997S 56% HA, 100 mL of 2-Carboyethylphosphonic acid, 2 mL of 5000 ppm Fe(III) ∽99 mg/10 mL

HCl      3.660 mL
+                     1.254 mL × 15 = 18.8% HA
NH$_3$OH 4.914 mL
+                     0.612 mL × 7.7 = 4.7% NH$_3$
NH$_4$   5.526 mL

1997S45=1 mL 1997S 56% HA, 100 mL of Mercaptonicotinic Acid 97.9 mg/10 mL, 2 mL of 5000 ppm Fe(III)

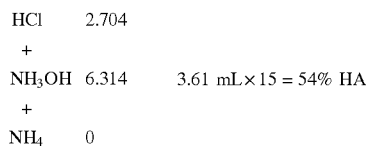

HCl      2.704
+
NH$_3$OH 6.314    3.61 mL × 15 = 54% HA
+
NH$_4$   0

1997S46=1 mL 1997S 56% HA, 100 mL of cyxtine 96 mg/10 mL 2 mL of 5000 ppm Fe(III)

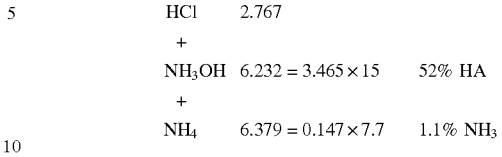

HCl    2.767
+
NH$_3$OH 6.232 = 3.465 × 15     52% HA
+
NH$_4$  6.379 = 0.147 × 7.7     1.1% NH$_3$

I claim:

1. A stabilized hydroxylamine solution comprising a selected stabilizer selected from the group consisting of
   (a) 1,4,8,11-tetraazacyclotetradecane-1,4,8,11-tetraacetic acid,
   (b) 4,8-dihydroxyquinoline-2-carboxylic acid,
   (c) 4,7-dihydroxy-1,10-phenanthroline,
   (d) 2-mercaptonicotinic acid,
   (e) bis[N,N-bis(carboxymethyl)-aminomethyl]fluorescein,
   (f) N,N'-bis(2-carboxyethyl)-N,N'-ethylenediglycine trihydrate,
   (g) cystine,
   (h) 2,3-dihydroxybenzoic acid,
   (i) thiosalicylic acid and
   (j) mixtures of the foregoing.

2. The stabilized solution as defined in claim 1 wherein said stabilizer is present in said solution in an amount ranging from about 0.005 percent to about 0.1 percent by weight to the total weight of the stabilized solution.

3. A method of stabilizing a hydroxylamine solution which comprises adding at least one selected stabilizer to the solution wherein said stabilizer is selected from the group consisting of
   (a) 1,4,8,11-tetraazacyclotetradecane-1,4,8,11-tetraacetic acid,
   (b) 4,8-dihydroxyquinoline-2-carboxylic acid,
   (c) 4,7-dihydroxy-1,10-phenanthroline,
   (d) 2-mercaptonicotinic acid,
   (e) bis[N,N-bis(carboxymethyl)-aminomethyl]fluorescein
   (f) N,N'-bis(2-carboxyethyl)-N,N'-ethylenediglycine trihydrate
   (g) cystine,
   (h) 2,3-dihydroxybenzoic acid,
   (i) thiosalicylic acid and
   (j) mixtures of the foregoing.

4. A method as defined in claim 3 wherein said stabilizer is added to yield an amount thereof in the solution of about 0.005 percent to about 0.1 percent by weight to the total weight of the solution.

5. A stabilized hydroxylamine solution comprising a selected stabilizer selected from the group consisting of
   (a) 1,4,8,11-tetraazacyclotetradecane-1,4,8,11-tetraacetic acid,
   (b) 4,8-dihydroxyquinoline-2-carboxylic acid,
   (c) 4,7-dihydroxy-1,10-phenanthroline,
   (d) 2-mercaptonicotinic acid,
   (e) bis[N,N-bis(carboxymethyl)-aminomethyl]fluorescein,
   (f) cystine,
   (g) 2,3-dihydroxybenzoic acid,
   (h) thiosalicylic acid and
   (i) mixtures of the foregoing.

* * * * *